Jan. 18, 1966 W. C. PARKINSON 3,230,325
PRESSURE RESPONSIVE SWITCH
Filed Oct. 6, 1961 3 Sheets-Sheet 1
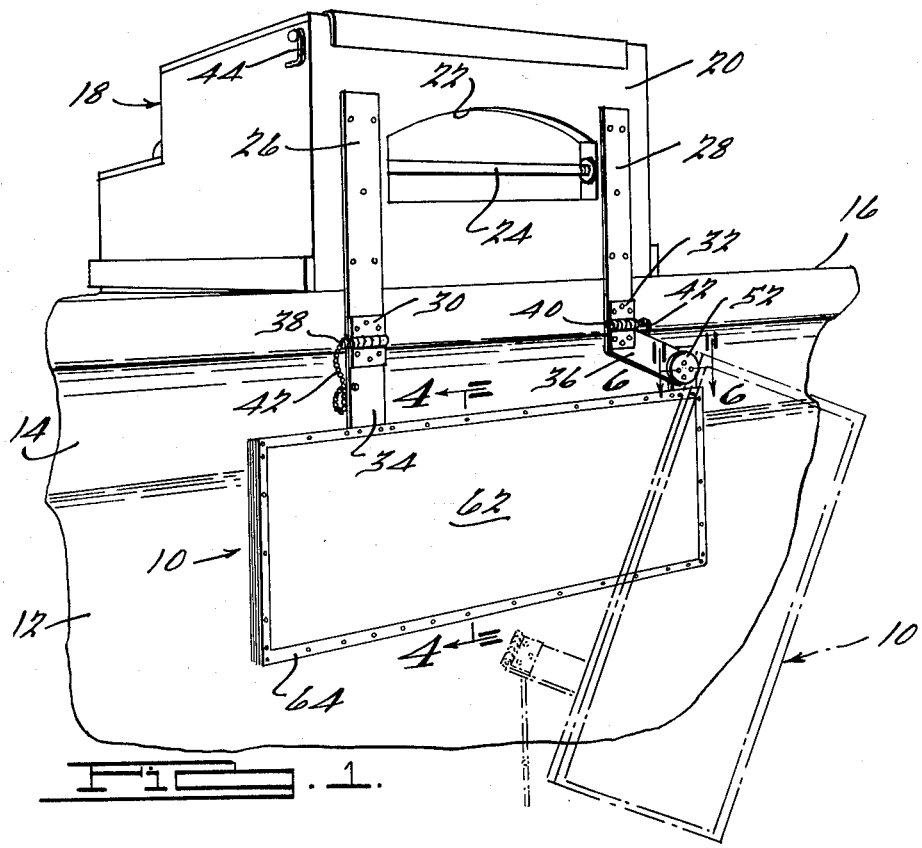
INVENTOR.
William C. Parkinson
BY
Harness, Dickey & Pierce
ATTORNEYS Jan. 18, 1966   W. C. PARKINSON   3,230,325
PRESSURE RESPONSIVE SWITCH
Filed Oct. 6, 1961   3 Sheets-Sheet 2
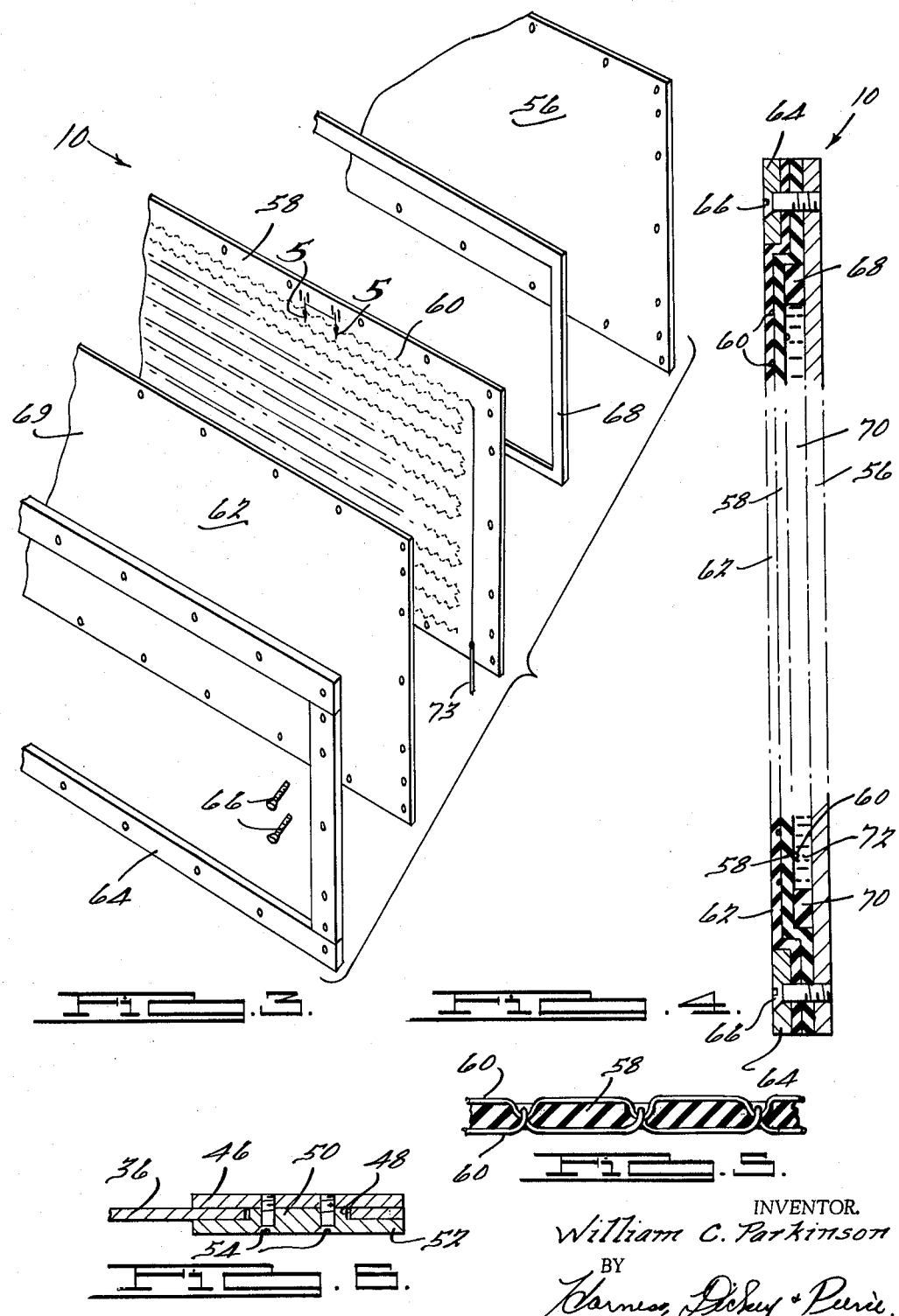
INVENTOR.
William C. Parkinson
BY
Harness, Dickey & Pierce.
ATTORNEYS.

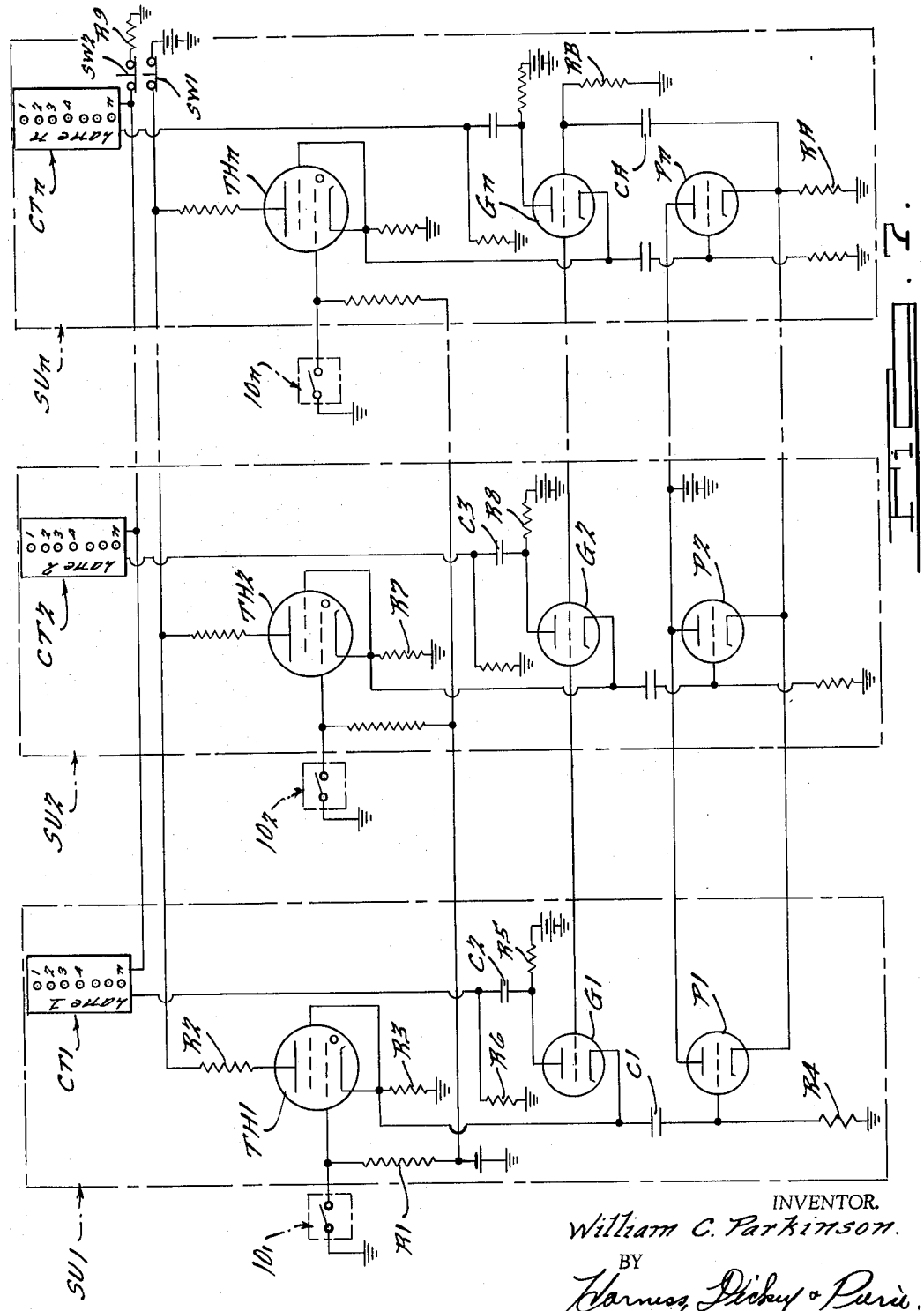

United States Patent Office 3,230,325
Patented Jan. 18, 1966

3,230,325
PRESSURE RESPONSIVE SWITCH
William C. Parkinson, 1600 Sheridan Drive,
Ann Arbor, Mich.
Filed Oct. 6, 1961, Ser. No. 143,513
11 Claims. (Cl. 200—52)

The present invention relates generally to automatic timing and sequence indicating systems, and more specifically to a novel system particularly adapted for automatically determining the elapsed times of individual contestants in a swimming race, and/or positively judging and indicating the sequence of finish of the respective contestants.

Historically, since the advent of competitive swimming, the task of accurately judging the finish of swimming races has been a difficult one, probably more so than in any other type of racing event. For the most part the inaccuracies normally encountered are primarily due to the fact that no judging system has yet been devised which is both acceptable to swimming officials and which totally eliminates the possibility of human error by removing the human link from the judging and timing operation. As far as is known, all systems to date have required or do require that an official push a button or the like the instant the swimmer finishes the race by touching the end of the pool, several judging officials being required for each swimmer in each race. The inherent inaccuracies, with often resulting unfairness, of such systems is apparent when it is realized that the swimmer may touch the end of the pool either above or below the surface of the water, and that the judges view of the finish is often obscured by wave motion and splash.

It is therefore a primary object of the present invention to provide a novel fully automatic judging and timing system wherein no factor of human error is introduced into the operation thereof, whereby completely accurate, objective, consistent, and fair judging and timing results may be easily and quickly obtained, and the required number of judging officials greatly reduced.

A further object of the present invention resides in the provision of a unique automatic judging system, maximum in reliability and foolproof in operation, which is no way interferes with the swimmers and which does not materially shorten or otherwise alter the length of the pool in which it is used from the standardized official length.

Yet another object concerns the provision of a judging system comprising the combination of two individually unique devices, namely a novel contact unit adapted to be positioned at the end of a swimming lane and activated in response to the swimmers touch at the finish of a race to control the operation of suitable electric devices, and a novel sequence indicating circuit responsive to actuation of the contact units positioned at the ends of the swimming lanes to positively and accurately determine and indicate by visual display the order or sequence of finish of the respective contestants in a given race.

A further object resides in the provision of a novel system of the aforementioned type wherein the contact unit is so constructed and positioned that it does not in any way interfere with the swimmer, and that a large contact area is provided, both above and below the surface of the water, so that contact and activation is assured when the swimmer finishes a race. A related object resides in the provision of a unique contact unit such as described which is extremely sensitive to even a light touch by the swimmer to accurately respond to the precise instant a race is finished, and yet which is unaffected by waves, splash and turbulence of the water, the unit further being of very simple and inexpensive construction, and of adjustable sensitivity.

Still another object resides in the provision of a contact unit of the aforementioned type which is positioned at the end of a pool in such a way that it may be conveniently and quickly moved to and retracted from an operational position in the swimmer's path, whereby it may be maintained out of the swimmer's path during intermediate laps in a multi-lap race or when otherwise desired. A related object concerns the provision of means whereby the contact unit may be readily moved to either one of two inactive or nonoperational positions.

Another object concerns the provision of a novel contact unit such as described which is essentially a normally open pressure responsive electric switch so constructed that it will function reliably without frequent maintenance for a long duration partially immersed in highly conductive and corrosive swimming pool water.

A still further object of the present invention resides in the provision of a novel system for detecting and recording the sequence of occurrence of a plurality of independent events.

These and other objects of the present invention will become apparent from consideration of the present specification taken in conjunction with the accompanying drawings in which one embodiment of the invention is illustrated for exemplary purposes, and wherein:

FIGURE 1 is a perspective view illustrating a contact unit constructed according to the principles of the present invention mounted in an operative position at the end of a conventional swimming pool, an alternate position of the contact unit being illustrated in phantom lines;

FIG. 2 is a perspective view similar to FIGURE 1, but showing the contact unit in a retracted position;

FIG. 3 is an exploded assembly view, in perspective, of the various parts constituting an embodiment of the contact unit;

FIG. 4 is a vertical sectional view taken along line 4—4 in FIGURE 1;

FIG. 5 is a modified sectional view taken substantially along line 5—5 in FIGURE 3;

FIG. 6 is a sectional view taken along line 6—6 in FIGURE 1; and

FIG. 7 is a schematic wiring diagram illustrating one embodiment of the sequence indicating circuit of the present invention.

Generally speaking, at the end of a swimming race, two types of information are required, namely, the order of sequence of finish for judging the event, and the times of the individual contestants. According to the present invention, the physical apparatus for supplying these two types of information comprises two basic components. The first is a contact unit for providing a definite electrical signal at the instant a swimmer touches the end of the pool at the finish of a race, and the second is an electronic circuit which may be controlled by each of the contact units at the end of the pool to accurately time and judge the finish of the race. The electronic circuit, in turn, may be made up of two components, a timing circuit and a sequence indicating circuit, although the timing circuit per se does not form a part of the present invention.

Referring more particularly to the drawings, the contact unit of the present invention, which is essentially a sensor or detecting unit in the form of a normally open pressure responsive electric switch, is generally indicated at 10, the contact unit being illustrated in FIGURES 1 and 2 in a fully mounted position at the end of a swimming pool. As can be seen, the swimming pool is provided with an end wall 12, a gutter 14 of conventional construction, and an upper surface or deck 16 on which is mounted in the usual way a starting block 18 of standard construction. The forward face of starting block 18, generally indicated at 20, is substantially flush with the edge of the pool and is provided with an aperture 22 across which extends a holding bar 24, adapted to be gripped by a swimmer preparatory to the start of a back stroke race, or the like.

Tightly secured to face 20 of the starting block are a pair of vertically extending mounting straps 26 and 28 which project downwardly below the level of the deck and which are provided at their lower ends with hinges 30 and 32, respectively. To the opposite ends of hinges 30 and 32 are secured support brackets 34 and 36, respectively, for supporting a contact unit 10. As can be seen, hinges 30 and 32 are of conventional removable-pin type construction having removable pins 38 and 40, respectively, each of the pins being attached to a separate short length of safety chain 42 which is in turn secured to the associated support bracket. Contact unit 10 may thus be easily and quickly either partially or totally disconnected from the support brackets with no chance of the pins being lost or misplaced.

Contact unit 10 is illustrated in solid lines in FIGURE 1 in a fully operative position against the end wall of the pool. As can be seen, the contact unit is of a size such that it will extend a substantial portion of the full width of the racing lane in which it is positioned, with a small portion of the upper contact surface thereof extending above the water level, which in the pool illustrated would be at the level of the sill of gutter 14. For a standard size pool a contact unit in the order of 40 inches by 15 inches is preferable so that it will be easily contacted by a contestant at the finish of a race. Insofar as the degree of immersion is concerned, the contact unit operates very well when it is immersed to a depth which leaves approximately four or five inches exposed above the surface of the water, though none of the dimensions are in any way critical. One such contact unit may be provided for each swimming lane in which a contestant will race.

In FIGURE 2 the contact unit 10 is illustrated in a raised position wherein it is maintained flat against the forward face 20 of the starting block by means of a suitable conventional detachable fastener 44. At the start of a race, each of the contact units would be in this raised position if the race was to be for a distance greater than one lap of the pool, in which case the contact units would be lowered to the operative position after the contestants had made their turn into the last lap. For single lap races the contact unit may remain in the lowered operative position. In races where the finish is at the opposite end of the pool from the starting blocks, any suitable means may be provided at the finish end of the pool for supporting the contact units in the same general manner as is illustrated.

Although the above two positions are satisfactory for most races, difficulty would be encountered in a multilap backstroke race where holding bar 24 must be used by a contestant at the start of the race. To solve this problem, unique means are provided whereby contact unit 10 may be lowered and swung to a second inoperative position, such as indicated in phantom lines in FIGURE 1. To achieve this, support bracket 36 is not connected directly to the contact unit but is pivotally secured to a mounting bracket 46 which is in turn secured to the contact unit, as seen in FIGURES 2 and 6. The pivotal connection between brackets 36 and 46 comprises an aperture 48 in bracket 36 into which rotatably projects a circular embossment 50 on a retaining disk 52 which is suitably secured to bracket 46 by means of machine screws 54 on the opposite side of bracket 36. Embossment 50 is slightly thicker than bracket 36 so that a pivotal relationship will exist. Thus, for a backstroke race, the procedure is to remove pin 42 from hinge 30 and allow the contact unit to swing down to the position shown in phantom lines in FIGURE 1 for the start of the race. After the last lap has been started the contact unit is then raised to the operative solid-line position by replacing pin 42 in hinge 30, so that the unit will be in proper position to accurately detect the finish of the race.

The details of construction of the contact unit may be best seen in FIGURES 3, 4 and 5 of the drawings. As mentioned above the contact unit is essentially a normally open pressure responsive electric switch which is closed when a contestant contacts the contact surface thereof at the finish of a race. Serving as one pole of the switch and as a main support is a backing plate 56 formed of a noncorroding electrically conductive relatively rigid material, such as aluminum or the like. Supporting the other pole of the switch is a similarly shaped sheet 58 of resilient nonconductive and noncorroding material, such as rubber or the like, which is adapted to be normally maintained generally parallel to and spaced from backing plate 56. A portion of the surface of resilient sheet 58 is made electrically conductive by sewing thereto an electrically conductive wire 60, formed of copper or the like. On the side of resilient sheet 58 opposite the side which faces backing plate 56, there is provided a second sheet 62 of similar nonconducting and noncorroding resilient material which serves to insulate and protect the otherwise exposed portions of the wire from the highly conductive and corrosive water in the swimming pool. Resilient sheets 58 and 62 may be sealingly secured to backing plate 56 by means of a mounting frame 64 which is attached about its entire periphery to backing plate 56 by a plurality of suitable screws or the like 66 to pinch or clamp the peripheral edges of the two sheets tightly against the periphery of the backing plate. The conductive portion of resilient sheet 58, namely, the portion in which wire 60 is sewn, is normally maintained in a generally parallel spaced relationship with respect to backing plate 56 by means of an electrically nonconductive spacer frame 68 which is slightly smaller in size than but similar in shape to the backing plate, as can be clearly seen in FIGURE 4.

Good results may be obtained utilizing a ⅛-inch thick aluminum backing plate, ¹⁄₁₆-inch thick sheets of rubber, No. 32 copper wire sewn in a conventional zig-zag stitch, such as illustrated in FIGURE 3, and ⅛-inch thick spacer frame, all in a unit of the aforementioned overall size. As is apparent, wire 60 is sewn only into the portion of resilient sheet 58 lying within the inside border of spacer frame 68, so that a touch or contact on the outer face or contact area 69 of sheet 62 will cause sheet 58 and the wire thereon to deflect across the space, indicated at 70, between resilient sheet 58 and backing plate 56 to close an electrical circuit between wire 60 and backing plate 56. Wire 60 may be sewn into resilient sheet 58 using any suitable type of stitch and in any pattern desired; however, it is preferable that the surface of the sheet be relatively densely covered with conducting wire and that there be an even distribution of the exposed portion of the wire on the face of the sheet opposing the backing plate. FIGURE 5 is somewhat of a developed sectional view illustrating stitches of conventional construction, wherein substantially equal amounts of wire 60 are exposed on each side of the sheet. If desired, however, the stitches may be formed using a wire and a thread, rather than two wires, so that wire will be exposed only on the side of the sheet which faces the backing plate. Alternately, wire or the like may be affixed to resilient sheet 58 in any other suitable manner, such as by molding into the sheet closely spaced rows of small diameter elongated coil springs and connecting the rows together electrically, however, sewing has been found to be particularly good since the flexibility of the sheet is not materially affected by the presence of the intermeshing wire and the cost of the unit is minimized. While the unit is illustrated as held together by means of screws or the like, any suitable fastening and sealing means may be utilized, and if desired, sheet 62 may be cemented to sheet 58 to form the desired insulating and protecting barrier. The entire unit is secured to brackets 34 and 46 by means of suitable machine screws or the like passing into the back face of backing plate 56.

In order to prevent the hydrostatic pressure of the water in the swimming pool from pressing sheet 58 and the wire thereon against backing plate 56, space 70 therebetween is filled with an insulating fluid 72. The composition of this fluid is quite critical, as it must be an excellent insulator, it must be of the proper density, and it must not be corrosive or harmful to the material of which resilient sheet 58 is formed, nor cause it to stretch or stiffen. Insofar as the proper density is concerned, it has been found that the best results are obtained using a fluid having approximately the same density or specific gravity as the fluid in which the contact unit is at least partially immersed, namely swimming pool water in the present embodiment. Thus, any increase in hydrostatic pressure due to a wave or splash will be balanced by the pressure of internal fluid 72. However, a relatively small force applied over a sufficiently small area, such as that due to a finger or hand upon touching the contact surface 69 on the outer face of resilient sheet 62, results in a large but localized increase in pressure and deflects the conducting portion of sheet 58 against the conducting backing plate 56 to close the circuit. Insulating fluids having a density or specific gravity slightly less than that of the surrounding fluid or swimming pool water have also been found to give satisfactory results. One fluid which has been found to meet all the criteria set forth is DC–200, a silicone oil made by The Dow-Corning Company. Other fluids having similar properties, of course, may alternately be used. Regarding the material of which resilient sheet 58 is formed, it is important that it be very elastic, not just flexible, since an identation caused by the local contact will increase the ratio of the surface area to the volume of the enclosed fluid, and therefore the sheet must be able to stretch.

The sensitivity of the contact unit may be readily adjusted by varying the amount or volume of fluid within space 70. Although the space should always be maintained full, the addition of more than a normal amount of fluid will cause the portion of the contact unit extending above the water to become even more insensitive to splash and wave motion, at the same time decreasing the overall sensitivity of the unit. On the other hand, sensitivity may be increased by decreasing the amount of fluid in space 70.

Electrical leads to each of the poles of the switch, namely backing plate 56 and wire 60, may be of any suitable form, such as by providing a lead 73 from the end of wire 60 and bringing it through an aperture in the backing plate to one element of a fluid tight electrical connector 74 secured to the backing plate in such a manner that the housing of the connector is in electrical communication with the backing plate to serve as the other element thereof, as shown in FIGURE 2. The lines to the judging table may then be run beneath the pool deck from suitable sockets therein adjacent each of the starting blocks, so that a short jumper line 75 having plugs on each end may be used to put each contact unit in communication with the judging table.

In general, the sequence indicating circuit, schematically illustrated in FIGURE 7 of the drawings, comprises a plurality of counter units, each of which visually displays an indication of the number of input pulses that have been applied thereto. Each contact unit 10, one being provided in each racing lane, has individual thereto a single counter, and means are provided whereby the actuation of any one of the contact units disables or locks the associated counter and steps each of the other counters so that as the several contact units are actuated in any sequence, the several counters individually display the order of that sequence and hence the sequence in which the contestants finished, each counter representing one racing lane.

The sequence indicating circuit comprises a sequence unit SU1, SU2 . . . SU$n$ individual to each of the contact units $10_1$, $10_2$ . . . $10_n$, in each racing lane. Each sequence unit, such as sequence unit SU1, comprises a switching tube, such as thyratron TH1, a gate tube, such as vacuum triode G1, a pulse tube, such as vacuum triode P1, and a counter, such as unit CT1. Each of the contact units, which may be of the aforementioned form illustrated in FIGURES 1 through 6 of the drawings, is schematically illustrated as a normally open single pole switch effective upon closing to apply an actuating potential to the associated switching tube. In the illustrated representative arrangement, thyratron TH1 is normally biased to a non-ionized state since the cathode thereof is grounded through a load resistor R3 and since the control grid thereof is connected to a source of negative potential through grid resistor R1. By utilizing a thyratron which will fire at high bias, the actuating potential may be applied by utilizing the contact unit $10_1$ to ground the control grid of the thyratron. Hence the negative biasing potential may be quite small, but a low voltage will appear across the contact unit $10_1$, thereby minimizing any danger of electrical shock.

Upon the application of the actuating potential to thyratron TH1 as the result of the actuation of contact unit $10_1$, plate current flows from a source of positive potential, through a normally closed switch SW1, a resistor R2, through the thyratron to ground through load resistor R3. Once fired, the grid of thyratron TH1 loses control so that the thyratron will remain conductive even though the actuation of contact unit $10_1$ is but transient.

The rise in potential of the cathode of thyratron TH1 as the result of the firing of that tube is applied across serially interconnected capacitor C1 and resistor R4, producing a positive pulse at the cathode grid of triode P1. The anode of that triode is connected to a source of positive potential and the cathode thereof is connected to ground through a load resistor RA which is common to the cathodes of all of the pulse tubes P1, P2 . . . P$n$ in the several sequence units. During this short pulse interval, the potential across the common cathode resistor RA momentarily rises to apply a positive pulse via capacitor CA and a resistor RB to the control grid of each of the several gate tubes G1, G2 . . . G$n$ in the several sequence units. This positive pulse will cause each of the gate tubes which is at that instant enabled or open to conduct or increase conductance. For example, the cathode of gate tube G2 is connected to ground through the load resistor R7 of thyratron TH2 and the anode is connected to a source of positive potential through load resistors R8. Assuming thyratron TH2 to be nonconductive, the application of the positive pulse to the control grid of gate tube G2 will cause a negative pulse to be applied via coupling capacitor C3 and resistor R8 to the input of the associated counter CT2. The counters may be of any suitable well-known type and are here assumed to step one unit in response to each negative pulse applied to the input thereof, and have their reset terminal connected to ground through a resistor, such as resistor R9 through switch SW2.

The positive pulses applied to the control grids G1, G2 . . . G$n$ will not, however, cause that tube to transmit the noted negative pulse if that tube has been disabled as a result of the firing of the associated thyratron. Thus, with thyratron TH1 fired as noted, the positive potential appearing at the cathode is applied to the cathode of gate tube G1 to bias that gate tube so far negatively so that the positive pulse applied to the control grid thereof will not produce an effective increase in the plate current through that tube, so that no negative stepping pulse will be applied to the counter CT1 which is individual to the sequence unit SU1.

Let it be assumed, for exemplary purposes, that the contact units are actuated in the sequence $10_1$, $10_n$, $10_2$, as would occur if the first place contestant was in lane one, the second place contestant in lane $n$ and the third in lane two. When contact $10_1$ is actuated by the contact of the contestant in lane 1 as he finishes the race, thyratron TH1 fires to apply a potential to the cathode G1 to disable or lock that tube. Each of the other gate tubes G2 . . . G$n$ will remain enabled. The firing of thyratron TH1 also pulses tube P1 and the resultant transient rise in potential across common cathode resistor RA results in the application of a positive pulse to the control grid of each of the gate tubes G1, G2 . . . G$n$. Tubes G2 and G$n$ will be rendered more conductive to apply negative pulses to counters CT2 and CT$n$ respectively. Both of those counters will accordingly be stepped to their number "2" positions. However, since gate tube G1 is blocked, counter CT1 will not be stepped and will retain a display of the number "1."

The apparatus will remain in this condition until the second event occurs in accordance with the above assumption, i.e. when contact unit $10_n$ is activated by the contestant in lane $n$ finishing the race. When this occurs thyratron TH$n$ fires to block gate tube G$n$ and to apply a pulse to tube P$n$. Tube P$n$ increases its conductivity and the resultant rise in potential against the common cathode resistor RA results in the application of a positive pulse to the control grids of each of the gate tubes G1, G2 . . . G$n$. Tubes G1 and G$n$ are, at this time blocked so that counter CT1 continues to display the number "1" and counter CT$n$ continues to display the number "2." However, gate tube G2 is enabled to increase conductivity so that a negative pulse will be applied to counter CT2 to step it to the number "3" display. When contact unit $10_2$ is actuated, the associated circuits will block gate tube G2 individual thereto to prevent any further stepping of counter CT2 and will apply pulses to the other sequence units to produce stepping of any sequence units other than the units SU1, SU2 and SU$n$.

At the completion of the event, the counters will display the sequence in which the contestants finished and will maintain that display until switch SW2 is opened, which will reset all of the counters to their number "1" positions. Thereafter, switch SW1 is manually actuated to open the anode circuits of the several thyratrons to extinguish the conductive thyratrons. In order to complete the restoration of the circuits to their initial conduction in preparation for the next event, switches SW1 and SW2 are reclosed, in that sequence.

The means for timing the event may consist of but a single timing unit to indicate the elapsed time of the winner of the event or, if desired, an individual timer may be provided for each or all of the contestants. The timer or timers may, if desired, be fully independent of the illustrated sequence units, using only the contact units, but in the preferred practice, however, they are taken in the presence of the switching tubes TH1 . . . TH$n$ in the sequence units. Thus, a timer individual to each of the contact units may be initiated in response to a starting switch in conjunction with the starting gun, or in response to the sharp report of the firing of the starting gun by means of an acoustic pick-up, and may be terminated in response to the rise in cathode potential or reduction in anode potential of the associated thyratron TH1 . . . TH$n$. If but one timer is provided to record only the elapsed time of the winner, its operation may be terminated in response to the firing of any one of the thyratrons by the use of a conventional "or" circuit connected to all of those thyratrons.

As will be appreciated, the above described sequence indicating circuit is of broader significance than simply in conjunction with a swimming race. It has utility in any application where it is desired to detect and record the sequence of occurrence of a plurality of independent events. Similarly, the contact unit has utility in many other applications where pressure responsive switches are needed, particularly those requiring the immersing of such a switch in some type of fluid.

Insofar as the accuracy of timing is concerned, circuitry or timers of any desired sophistication may be utilized. Thus, relatively inexpensive timers having a resolution in the order of $1/100$ of a second may be used, or for a slightly larger cost timers having a resolution in the order of several millionths of a second may be used. In any case, the accuracy obtained is a significant improvement over times obtained by human timers. For example, it is not at all unusual for three stop watches to show a scatter of as much as 0.3 second in a given heat. This is due in part to the uncertainty of the moment of touch, because of splash, and in part to human reaction time. Usually a human timer puts in his own reaction at the start of the race, since he cannot anticipate the gun flash, but not always at the finish where he frequently anticipates the touch by observing the progress of the swimmer towards the finish line. As an additional benefit, the use of the present system results in the decrease to one-fourth or one-fifth the number of officials required to run a championship swimming meet, and at the same time eliminate inexperienced and unequal officiating. Furthermore, it permits heats to be run off more quickly and more efficiently, particularly championship meets where there are many preliminary heats.

Economy is another asset of the present system. In this regard it is estimated that a relatively simple system for judging a race and providing times for each lane accurate to $1/100$ of a second would cost less than the total number of stop watches presently used in a meet. A more sophisticated and accurate system would, of course, be more expensive, and if desired it would even be possible to have both the timing and judging results displayed automatically on a scoreboard visible to the spectators.

In actual practice it has been found that the contact units of the present invention may be used without shortening the length of an official pool. In the embodiments actually tested, the aforementioned dimensions were used, so that the contact unit had a total thickness of $1/4$ of an inch in the closed position. While this increment would be subtracted from the actual length of the pool, it would only have effect on the very last pool-length of the race, when the contact units are lowered to their operative position. This $1/4$ of an inch, however, is not critical, since swimming pools are generally constructed from $1/4$ to $1/2$ inch larger than the official length. Furthermore, if desired, the contact units can be advantageously permanently built into the end of a pool, flush with the surface thereof, so that no objection could be raised regarding alteration of official pool length.

A future feature of the contact units of the present invention is that they in no way interfere with the swimmer, and in addition, that the swimmers do not have difficulty in touching the contact area of the contact unit at the finish of a race.

Thus, there are disclosed in the above description and in the drawings an exemplary embodiment of the present invention which fully and effectively accomplishes the objects thereof. However, it will be apparent that variations in the details of construction may be indulged in without departing from the sphere of the invention as herein described or the scope of the appended claims.

What is claimed is:

1. A pressure responsive electrical switch normally vertically disposed for operation at least partially immersed beneath the surface of a liquid in a swimming pool and responsive to a force over a small area thereof comprising: a relatively rigid, electrically conductive backing member forming one pole of the switch; a sheet of resilient material positioned in normally spaced relationship to said backing member, at least a portion of said resilient sheet being electrically conductive to form another pole of the switch; means for sealingly securing said resilient sheet to said backing member to define a sealed space therebetween, and means for maintaining the conductive portion of said resilient sheet normally in spaced relation to said backing member including a non-conducting liquid filling the space between said resilient sheet and said backing member for resisting forces of the liquid in the swimming pool due to pressure and motion thereof while remaining sensitive to the force over a small area.

2. A pressure responsive electrical switch normally vertically disposed for operation at least partially immersed beneath the surface of a liquid in a swimming pool and responsive to a force over a small area thereof comprising: a relatively rigid, electrically conductive backing member forming one pole of the switch; a sheet of resilient material normally positioned in spaced relationship to said backing member, at least a portion of said resilient sheet being electrically conductive to form another pole of the switch; means for sealingly securing said resilient sheet to said backing member to define a sealed space therebetween, and means for maintaining the conductive portion of said resilient sheet normally in spaced relation to said backing member including a non-conducting liquid filling the space between said resilient sheet and backing member for resisting forces of the liquid in the swimming pool due to pressure and motion thereof while remaining sensitive to the force over a small area, said liquid being of approximately the same specific gravity as the liquid in which the switch is at least partially immersed.

3. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of resilient material positioned in normally spaced relationship to said backing member; electrically conductive wire means supported by said resilient sheet and being at least partially exposed on the side of said sheet facing said backing member, said electrically conductive wire means forming another pole of the switch; means for sealingly securing said resilient sheet to said backing member to define a sealed space therebetween, and means for maintaining said exposed portion of said conductive wire means normally in spaced relation to said backing member including a non-conducting liquid filling the space between said resilient sheet and said backing member for resisting forces of the liquid in the swimming pool due to pressure and motion thereof while remaining sensitive to the force over a small area.

4. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of resilient material positioned in normally spaced relationship to said backing member; electrically conductive wire means supported by said resilient sheet and being at least partially exposed on the side of said sheet facing said backing member, said electrically conductive wire means forming another pole of the switch; means for sealingly securing said resilient sheet to said backing member to define a sealed space therebetween, and means for maintaining said exposed portion of said conductive wire means normally in spaced relation to said backing member including a non-conducting liquid filling the space between said resilient sheet and said backing member for resisting forces of the liquid in the swimming pool due to pressure and motion thereof while remaining sensitive to the force over a small area, said liquid being of approximately the same specific gravity as the liquid in which the switch is at least partially immersed.

5. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of electrically non-conductive resilient material normally positioned in spaced relationship to said backing member; electrically conductive wire means sewn into said resilient sheet in a relatively uniform pattern across the face thereof; means for sealingly securing said resilient sheet to said backing member to define a sealed space therebetween, and means for maintaining the portion of said resilient sheet in which said wire means are sewn normally in spaced relation to said backing member including a non-conducting liquid filling the space between said resilient sheet and said backing member for resisting forces of the liquid in the swimming pool due to pressure and motion thereof while remaining sensitive to the force over a small area.

6. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of electrically non-conductive resilient material normally positioned in spaced relationship to said backing member; electrically conductive wire means sewn into said resilient sheet in a relatively uniform pattern across the face thereof; means for sealingly securing said resilient sheet to said backing member to define a sealed space therebetween, and means for maintaining the portion of said resilient sheet in which said wire means are sewn normally in spaced relation to said backing member including a non-conducting liquid filling the space between said resilient sheet and said backing member for resisting forces of the liquid in the swimming pool due to pressure and motion thereof while remaining sensitive to the force over a small area, said liquid being of approximately the same specific gravity as the liquid in which the switch is at least partially immersed.

7. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of electrically non-conductive resilient material normally positioned in spaced relationship to said backing member; electrically conductive wire means sewn into said resilient sheet in a relatively uniform pattern across the face thereof; means for sealingly securing said resilient sheet to said backing member to define a sealed space therebetween, means for maintaining the portion of said resilient sheet in which said wire means are sewn normally in spaced relation to said backing member, including a non-conducting liquid filling the space between said resilient sheet and said backing member for resisting forces of the liquid in the swimming pool due to pressure and motion thereof while remaining sensitive to the force over a small area, and a second sheet of electrically non-conductive resilient material sealingly secured to the side of said first resilient sheet opposite the side thereof facing said backing member, said second resilient sheet fully covering the area of said first resilient sheet in which said wire means are sewn.

8. A pressure responsive electrical switch normally vertically disposed for operation at least partially immersed beneath the surface of a liquid in a swimming pool and responsive to a force over a small area thereof, comprising: a relatively rigid, electrically conductive backing member forming one pole of the switch; a sheet of electrically non-conductive resilient material normally positioned in spaced relationship to said backing member; electrically conductive wire means sewn into said resilient sheet in a relatively uniform pattern across the face thereof; means for sealingly securing said resilient sheet to said backing member to define a sealed space therebetween, means for maintaining the portion of said resilient sheet in which said wire means are sewn normally in spaced relation to said backing member; a non-conducting liquid filling the space between said resilient sheet and said backing member for resisting forces of the liquid in the swimming pool due to pressure and motion thereof while remaining sensitive to the force over a small area, said liquid being of approximately the same specific gravity as the liquid in which the switch is at least partially immersed, and a second sheet of electrically non-conductive resilient material sealingly secured to the side of said first resilient sheet opposite the side thereof facing said backing member, said second resilient sheet fully covering the area of said first resilient sheet in which said wire means are sewn.

9. A pressure responsive electrical switch normally vertically disposed for operation at least partially immersed beneath the surface of a liquid in a swimming pool and responsive to a force over a small area thereof, comprising: an electrically conductive member forming one pole of the switch; a sheet of resilient material positioned adjacent said member and having a surface thereon facing a surface on said member, at least a portion of said surface on said resilient sheet being electrically conductive to form another pole of the switch; means for sealingly securing said resilient sheet to said member around the periphery of said surfaces; means for normally maintaining said surface on said resilient sheet in spaced relation to said member including a non-conducting liquid filling the space between said resilient sheet and said backing member for resisting forces of the liquid in the swimming pool due to pressure and motion thereof while remaining sensitive to the force over a small area.

10. A pressure responsive electrical switch normally vertically disposed for operation at least partially immersed beneath the surface of a liquid in a swimming pool and responsive to a force over a small area thereof, comprising: an electrically conductive member forming one pole of the switch; a sheet of resilient material positioned adjacent said member and having a surface thereon facing a surface on said member, at least a portion of said surface on said resilient sheet being electrically conductive to form another pole of the switch; means for sealingly securing said resilient sheet to said member around the periphery of said surfaces; means for normally maintaining said surface on said resilient sheet in spaced relation to said member, including a non-conducting liquid filling the space between said resilient sheet and said backing member for resisting forces of the liquid in the swimming pool due to pressure and motion thereof while remaining sensitive to the force over a small area, said liquid being approximately the same specific gravity as the liquid in which the switch is at least partially immersed.

11. A pressure responsive electrical switch normally vertically disposed for operation at least partially immersed beneath the surface of a liquid in a swimming pool and responsive to a force over a small area thereof, comprising: an electrically conductive member forming one pole of the switch; a sheet of resilient material positioned adjacent said member and having a surface thereon facing a surface on said member, at least a portion of said surface on said resilient sheet being electrically conductive to form another pole of the switch; means for sealingly securing said resilient sheet to said member around the periphery of said surfaces; means for normally maintaining said surface on said resilient sheet in spaced relation to said member including a liquid filling the space between said resilient sheet and backing member for resisting forces of the liquid in the swimming pool due to pressure and motion thereof while remaining sensitive to the force over a small area, said liquid being silicone oil having approximately the same specific gravity as the liquid in which the switch is at least partially immersed.

References Cited by the Examiner

UNITED STATES PATENTS

| | | | |
|---|---|---|---|
| 2,340,635 | 2/1944 | Anderson | 235—92 |
| 2,418,905 | 4/1947 | Sage | 200—61.54 |
| 2,543,214 | 2/1951 | Wildberg | 200—61.54 |
| 2,693,912 | 11/1954 | Beckham | 235—92 |
| 2,843,695 | 7/1958 | Osuch et al. | 200—86 |
| 2,951,921 | 9/1960 | Wikkerink | 200—86 |

FOREIGN PATENTS

| | | |
|---|---|---|
| 274,148 | 6/1927 | Great Britain. |
| 432,567 | 7/1935 | Great Britain. |
| 760,142 | 10/1956 | Great Britain. |

BERNARD A. GILHEANY, *Primary Examiner.*

MALCOLM A. MORRISON, ROBERT K. SCHAEFER, *Examiners.*